United States Patent Office 3,573,939
Patented Apr. 6, 1971

3,573,939
Ta₂O₅ NUCLEATED GLASS-CERAMIC ARTICLES
George H. Beall, Corning, N.Y., assignor to Corning
Glass Works, Corning, N.Y.
No Drawing. Filed Jan. 19, 1968, Ser. No. 699,020
Int. Cl. C03c 3/22
U.S. Cl. 106—39                                        4 Claims

ABSTRACT OF THE DISCLOSURE

This invention relates to the manufacture of glass-ceramic articles in the $Li_2O$—$SiO_2$ composition field which are nucleated with $Ta_2O_5$. Such articles can be transparent to opaque and contain the ferroelectric perovskite crystal $LiTaO_3$ as the principal crystal phase or, when containing $Al_2O_3$, can be transparent to opaque and contain the low expansion beta-spodumene solid solution and beta-$Ta_2O_5$ as the primary crystal phase.

---

The manufacture of glass-ceramic articles is founded upon the controlled crystallization of glass articles through the heat treatment thereof. Thus, in broad outline, the production of glass-ceramic articles comprises three primary steps: first, a glass-forming batch which normally contains a nucleating or crystallization-promoting agent is melted; second, this melt is cooled sufficiently rapidly such that a glass article is formed; and, third, the glass article is exposed to a particularly-defined heat treatment such that relatively uniformly-sized, fine-grained crystals homogeneously dispersed in a glassy matrix are crystallized in situ. The resulting glass-ceramic article is predominantly crystalline, i.e., greater than 50% by weight crystalline. In common practice, the heat treatment consists of two steps: (1) the glass article is heated at a temperature above the transformation range of the glass but below the softening point thereof to cause the development of nuclei therein; and (2) the nucleated article is heated to a temperature above the softening point of the glass to promote the growth of crystals on the nuclei.

Since a glass-ceramic article is formed through the crystallization in situ of a glass article, it is free of voids and non-porous. Further, inasmuch as a glass-ceramic article is highly crystalline, the chemical and physical properties thereof will be more closely akin to those of the crystal phase than of the original glass. Finally, it can be appreciated that the residual glassy matrix will have a far different composition from that of the original glass article since the components comprising the crystals will have been precipitated therefrom.

I have discovered that certain glasses in the $Li_2O$—$SiO_2$ field, when nucleated with $Ta_2O_5$ and, optionally, $Nb_2O_5$, can be crystallized in situ to produce glass-ceramic articles of two types: (1) the articles may be transparent to opaque and contain the ferroelectric perovskite crystal $LiTaO_3$ as the principal crystal phase; or (2) when containing $Al_2O_3$, the articles may be transparent to opaque and contain beta-spodumene solid solution and/or beta-$Ta_2O_5$ as the primary crystal phases.

In the most general terms, my invention comprises melting a batch for a glass consisting essentially, by weight on the oxide basis, of about 10–60% $SiO_2$, 0–25% $Al_2O_3$, 2–7% $Li_2O$, and 20–80% $Ta_2O_5+Nb_2O_5$ wherein up to 20% $Nb_2O_5$ may be included. The presence of $Al_2O_3$ is not only necessary to cause the development of the low expansion beta-spodumene solid solution crystals but also improves the quality of the glass prior to crystallization thereof in situ. The melt is simultaneously cooled to at least below the transformation range thereof and a glass article shaped therefrom and, thereafter, this glass article is heated to a temperature within the range of about 750°– 1200° C. for a period of time of sufficient length to attain the desired crystallization in situ. The transformation range is that temperature at which a liquid melt is deemed to have been converted to an amorphous solid, this temperature generally lying between the strain point and annealing point of the glass. Inasmuch as the crystallization in situ is a process dependent upon time and temperature, it can readily be appreciated that, at temperatures within the upper extreme of the crystallization range, only brief dwell periods will be required, viz., about ¼ hour or even less; whereas, in the cooler extreme of the crystallization range, dwell times as long as 24–48 hours may be required to attain satisfactory crystallization.

My preferred heat treatment procedure involves a two-step method wherein the glass article is first heated to a temperature somewhat above the transformation range, i.e., between about 700°–900° C., and maintained thereat for a sufficient length of time to promote satisfactory nucleation and begin crystal growth. Thereafter, the article is heated to about 900°–1200° C. and held thereat for a period of time sufficient to assure assentially complete crystal growth. In my preferred two-step heat treating schedule, a nucleation dwell time of about 1–6 hours followed by a crystallization growth period of about 1–8 hours is commonly employed.

It will be understood that various modifications in the manufacturing procedure are envisioned. For example, when the melt is cooled below the transformation range thereof and shaped to a glass article, the glass article may be cooled all the way to room temperature to permit visual inspection for glass quality prior to commencing the heat treating step. Nevertheless, where speed in production and fuel economies are sought, the melt may merely be quenched to a glass shape at just below the transformation range and the crystallization in situ thereof begun immediately. Further, although a two-step heat treatment schedule is preferred, a very satisfactory product can be achieved when the glass article is simply heated from room temperature or the transformation range to temperatures within the 750°–1200° C. range and maintained within that range for a sufficient length of time to develop the extensive crystallization desired. Finally, if the rate of heating is not too rapid and the final crystallization temperature is near the upper extreme of the heat treating range, no dwell period, as such, at any one temperature will be necessary. However, since the growth of crystals is time and temperature dependent, the rate of heating the glass article above the transformation range must not be so rapid that the growth of sufficient crystals to support the article cannot occur. This absence of crystallization will lead to consequent deformation and slumping of the article. Thus, whereas heating rates of 10° C./minute and higher have been employed successfully, especially where physical supports have been provided for the glass articles to inhibit deformation thereof, I prefer to utilize a heating rate of about 3–5° C./minute. These heating rates have produced articles exhibiting very little, if any, deformation throughout the field of compositions comprising this invention.

Table I reports compositions, expressed in weight percent on the oxide basis, of thermally crystallizable glasses which were heat treated in accordance with the method of this invention to produce uniformly fine-grained glass-ceramic articles. The batch ingredients may constitute any materials, either oxides or other compounds which, on being melted together, are converted to the desired oxide compositions in the proper proportions. The batch ingredients were compounded, ball milled together to aid in obtaining a homogeneous melt, and thereafter melted in open platinum crucibles for about 16 hours at temperatures between about 1500°–1600° C. Glass cane of about ½" diameter were drawn from each melt and the remainder poured onto a steel plate to give a circular patty about ½" in thickness. The glass patties were immediately transferred to an annealer operating at 650° C. Following annealing, the glass cane and patties were placed in an electrically-fired furnace and exposed to the heat treatment schedules recorded in Table II. At the conclusion of the heat treatment, the current to the furnace was cut off and the crystallized articles were either re- Table II records the heat treatment schedule to which each glass article was subjected, a visual description of each crystallized article, a measurement of the coefficient of thermal expansion (25°–300° C.), measurements of dielectric constants and loss tangents, and the crystal phases present as determined by X-ray diffraction analysis. In each schedule, the temperature was raised at a rate of about 5° C./minute to the dwell temperatures.

TABLE II

Ferroelectric $LiTaO_3$ glass-ceramics

| Example No. | 4 hours heat treatment, ° C. | Description | Crystal phases | Dielectric constant at— | Loss tangent at— | Exp. coef. ($\times 10^{-7}$/° C.) |
|---|---|---|---|---|---|---|
| 1 | 750 / 950 | Transparent, yellow gold | $LiTaO_3$, $Li_2Si_2O_5$, beta-quartz solid solution | 1 kc. 22.1 / 10 kc. 34.0 | 1 kc. 0.080 / 10 kc. 0.029 | 53.9 |
| 2 | 750 / 950 | White, opaque, cherty | do | 10 kc. 312.0 | 10 kc. 0.153 | |
| 3 | 750 / 950 | do | do | 1 kc. 35.9 / 10 kc. 34.0 | 1 kc. 0.053 / 10 kc. 0.029 | |
| 4 | 750 / 950 | do | $LiTaO_3$, $(Li_2, Mg) Si_2O_5$ | 1 kc. 63.5 | 1 kc. 0.009 | |
| 5 | 750 / 900 | Transparent, orange | $LiTaO_3$, $Li_2Si_2O_5$, beta-quartz solid solution | 1 kc. 27.0 | 1 kc. 0.095 | |
| 6 | 750 / 950 | White, opaque, cherty | $LiTaO_3$, $Li_2Si_2O_5$ | 1 kc. 379.3 / 10 kc. 92.1 | 10 kc. 0.589 | |
| 7 | 750 / 950 | do | $LiTaO_3$, $Li_2Si_2O_5$ | 1 kc. 184.0 / 10 kc. 60.9 | 10 kc. 0.424 | |

Low expansion beta-spodumene and/or beta-$Ta_2O_5$ glass-ceramics

| | | | | | | |
|---|---|---|---|---|---|---|
| 8 | 750 / 925 | Transparent, yellow | Beta-$Ta_2O_5$, beta-quartz solid solution | | | −1.7 |
| | 800 / 1,100 | White, waxy | Beta-$Ta_2O_5$, beta-spodumene solid solution | | | 0.4 |
| 9 | 750 / 950 | Transparent, yellow, slight haze | Beta-$Ta_2O_5$, beta-spodumene solid solution, beta-quartz solid solution, $AlTaO_4$ | | | −3.0 |
| 10 | 790 / 1,100 | Gray-white, cherty | Beta-spodumene solid solution, $AlNbO_4$ | | | 3.0 |
| 11 | 800 / 1,100 | Gray-white, cherty | Beta-spodumene solid solution beta-$Ta_2O_5$ | | | 3.5 | moved from the furnace directly into the ambient atmosphere or merely left in the furnace and allowed to cool to room temperature within the furnace. The furnace rate of cooling was estimated to average about 3°–5° C./minute.

Although the above-recited amounts of $Li_2O$, $SiO_2$, and nucleating agent and, where desired, $Al_2O_3$ are required to secure a glass-ceramic article containing $LiTaO_3$, beta-spodumene solid solution, and/or beta-$Ta_2O_5$ as the principal crystal phases with such minor phases as beta-quartz solid solution, $Li_2Si_2O_5$, $AlTaO_4$, and $AlNbO_4$, small amounts of compatible metal oxides totalling not more than about 10% by weight may be included to aid in melting the batch or to modify the chemical and physical properties of the final product. Thus, additives of ZnO and MgO will yield gahnite ($ZnO \cdot AlO_3$) and spinel ($MgO \cdot Al_2O_3$), respectively. $B_2O_3$, $Na_2O$, $K_2O$, CaO, and SrO appear to inhibit crystal growth and are preferably present in amounts totalling less than about 5% by weight. PbO and $P_2O_5$ appear to act as fluxes and also are preferably present in amounts less than about 5% by weight.

The melts of the glasses reported in Table I are quite fluid so no fining agent was utilized. However, in large scale melting practice, a conventional fining agent such as $As_2O_3$ may be added as needed.

TABLE I

Ferroelectric $LiTaO_3$ glass-ceramics

| | 1 | 2 | 3 | 4 | 5 | 6 | 7 |
|---|---|---|---|---|---|---|---|
| $SiO_2$ | 31.0 | 31.0 | 12.0 | 17.0 | 21.5 | 18.0 | 18.0 |
| $Li_2O$ | 4.0 | 4.0 | 5.0 | 4.0 | 4.5 | 4.0 | 4.0 |
| $Ta_2O_5$ | 60.0 | 50.0 | 80.0 | 75.0 | 70.0 | 74.0 | 70.0 |
| $Al_2O_3$ | 5.0 | 5.0 | 3.0 | 1.0 | 4.0 | | |
| $P_2O_5$ | | | | | | 1.0 | |
| PbO | | 7.0 | | | | | |
| $ZrO_2$ | | 3.0 | | | | 5.0 | |
| MgO | | | | 3.0 | | | 3.0 |
| CaO | | | | | | 4.0 | |

Low expansion beta-spodumene and/or beta-$Ta_2O_5$ glass-ceramics

| | 8 | 9 | 10 | 11 |
|---|---|---|---|---|
| $SiO_2$ | 47.0 | 46.0 | 56.0 | 50.0 |
| $Al_2O_3$ | 10.0 | 20.0 | 20.0 | 10.0 |
| $Li_2O$ | 3.0 | 4.0 | 4.0 | 3.0 |
| $Ta_2O_5$ | 40.0 | 30.0 | | 37.0 |
| $Nb_2O_5$ | | | 20.0 | |

Tables I and II clearly illustrate the composition and process parameters for producing glass-ceramic articles according to this invention. My laboratory work has demonstrated that transparent glass-ceramic articles containing the ferroelectric perovskite crystal $TiTaO_3$ as the principal phase can be developed in the composition area of about 3–6% $Li_2O$, 2–10% $Al_2O_3$, 20–55% $SiO_2$, and 40–70% $Ta_2O_5 + Nb_2O_5$ wherein $Nb_2O_5$ ranges up to about 10%. Transparent to opaque articles exhibiting very low coefficients of thermal expansion and containing beta-spodumene solid solution and beta-$Ta_2O_5$ as the principal phases can be produced in the composition area of about 2.5–5% $Li_2O$, 7–20% $Al_2O_3$, 40–60% $SiO_2$, and 20–40% $Ta_2O_5 + Nb_2O_5$ wherein $NbO_5$ ranges up to about 20%.

The crystal content of the articles is greater than about 50% by weight and commonly exceeds about 75% by weight, depending upon the extent to which the components of the batch are adaptable to the formation of crystal phases. The crystals, themselves, are reasonably uniformly fine-grained, substantially all being smaller than about 10 microns in diameter and most being smaller than 1 micron in diameter.

Example 1 is my preferred composition which, when subjected to the heat treating schedule set out in Table II, produces an article which is transparent, uniformly fine-grained, and exhibits a high dielectric constant accompanied with a low loss tangent. Such a material is useful in capacitors, resistors, and electroptic applications.

Example 6 gives an example of an opaque material with a particularly high dielectric constant, but the loss tangent is also high.

I claim:

1. A thermally crystallizable glass consisting essentially, by weight on the oxide basis, of about 2–7% $Li_2O$, 0–25% $Al_2O_3$, 10–60% $SiO_2$, and 20–80% $Ta_2O_5 + Nb_2O_5$ wherein $Nb_2O_5$ is present in an amount of about 0.20%.

2. A glass-ceramic article consisting essentially of fine-grained crystals of at least one compound selected from the group consisting of $LiTaO_3$, beta-spodumene solid solution, and beta-$Ta_2O_5$ substantially uniformly dispersed in a glassy matrix and comprising the major proportion of the article, said crystals being formed through crystallization in situ from a glassy body consisting essentially, by weight on the oxide basis, of about 2–7% $Li_2O$, 0–25% $Al_2O_3$, 10–60% $SiO_2$, and 20–80% $Ta_2O_5+Nb_2O_5$ wherein $Nb_2O_5$ is present in an amount of about 0–20%.

3. A transparent glass-ceramic article consisting essentially of fine-grained crystals of $LiTaO_3$ substantially uniformly dispersed in a glassy matrix and comprising the major proportion of the article, said crystals being formed through crystallization in situ from a glass body consisting essentially, by weight on the oxide basis, of about 3–6% $Li_2O$, 2–10% $Al_2O_3$, 20–55% $SiO_2$, and 40–70% $Ta_2O_5+Nb_2O_5$ wherein $NbO_5$ is present in an amount of about 0–10%.

4. A glass-ceramic article exhibiting a very low coefficient of thermal expansion consisting essentially of fine-grained crystals of beta-spodumene solid solution and/or beta-$Ta_2O_5$ substantially uniformly dispersed in a glassy matrix and comprising the major proportion of the article, said crystals being formed in situ from a glass body consisting essentially, by weight on the oxide basis, of about 2½–5% $Li_2O$, 7–20% $Al_2O_3$, 40–60% $SiO_2$, and 20–40% $Ta_2O_5+Nb_2O_5$ wherein $NbO_5$ is present in an amount of about 0–20%.

References Cited
UNITED STATES PATENTS

| | | | |
|---|---|---|---|
| 2,920,971 | 1/1960 | Stookey | 106—39 |
| 3,006,775 | 10/1961 | Chen | 106—39 |
| 3,084,053 | 4/1963 | Arlett et al. | 106—39 |
| 3,113,877 | 12/1963 | Janakirama | 106—39 |
| 3,114,066 | 12/1963 | Allen et al. | 106—39 |
| 3,195,030 | 7/1965 | Herczog et al. | 106—39 |
| 3,252,811 | 5/1966 | Beall | 106—39 |

HELEN M. McCARTHY, Primary Examiner

U.S. Cl. X.R.

65—33; 106—52; 317—258